UNITED STATES PATENT OFFICE.

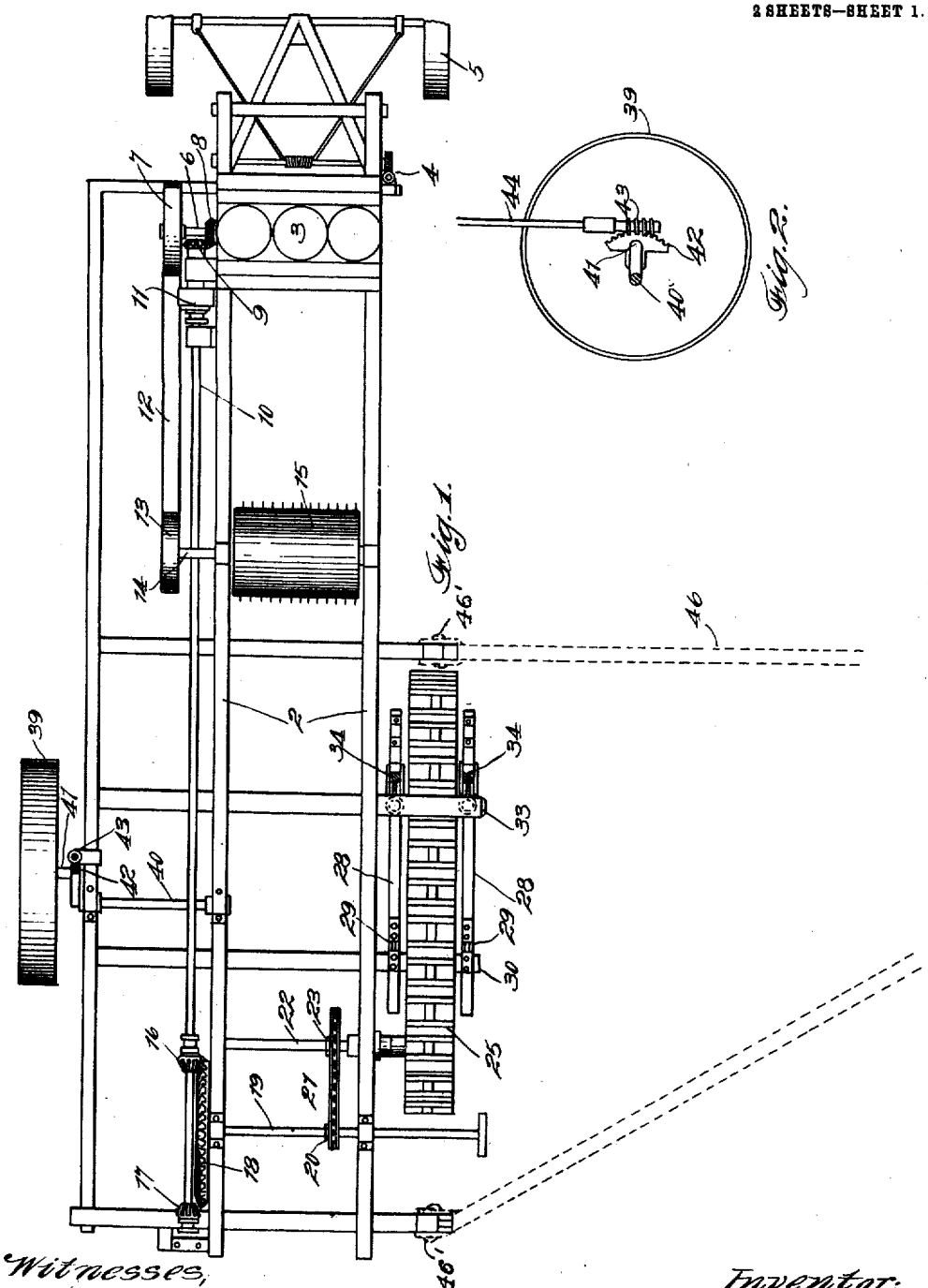

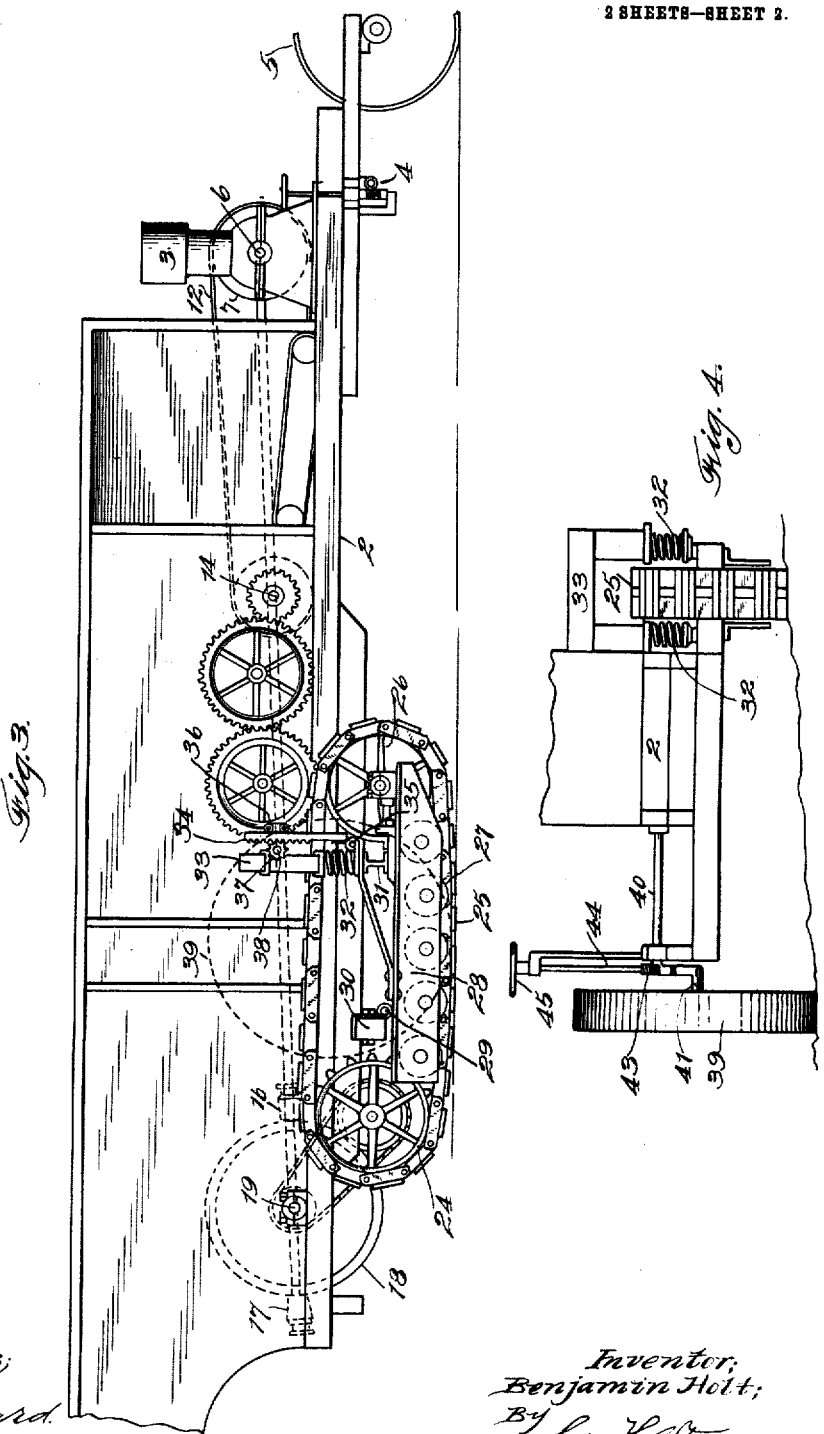

BENJAMIN HOLT, OF STOCKTON, CALIFORNIA.

COMBINED HARVESTER.

952,330.  Specification of Letters Patent.  Patented Mar. 15, 1910.

Application filed December 24, 1908. Serial No. 469,044.

*To all whom it may concern:*

Be it known that I, BENJAMIN HOLT, a citizen of the United States, residing at Stockton, in the county of San Joaquin and State of California, have invented new and useful Improvements in Combined Harvesters, of which the following is a specification.

This invention relates to combined harvesters and pertains particularly to that class of harvesters which are self-propelled.

It is one of the purposes of this invention to provide a simple, combined harvester and thresher, embodying a traction and propelling member, which is particularly effective by reason of the large contacting surface it presents, and means by which said traction member is yieldingly mounted upon the main frame of the harvester; and while primarily the invention provides an improved combined harvester for level ground work, it also comprehends means whereby the machine may be adapted to be successfully operated upon slightly hilly or rolling ground.

My invention consists of the elements, and the construction and combination of elements as set forth in the accompanying specification and drawings, in which—

Figure 1 is a plan view of the harvester, with the housing removed. Fig. 2 is a detailed sectional view, showing the means for adjusting the bearing-wheel. Fig. 3 is a side view of the device. Fig. 4 is a representation of the end of the machine.

In the embodiment of my invention as shown in the accompanying drawings, a main frame 2 is provided, upon the forward end of which is mounted a suitable motor 3, and also carrying suitable steering mechanism 4 for controlling the steering-wheels 5.

The engine-shaft 6 projects sufficiently beyond one side of the main frame to carry a suitable fly-wheel 7 and bevel-gear 8, which gear is adapted to mesh with a similar gear 9 for the purpose of transmitting power to the longitudinally disposed shaft 10. A suitable clutch 11 adaptable to reverse or disconnect the shaft 10 is shown mounted proximate the gears 8—9. A belt 12 is passed over the fly-wheel 7, running rearwardly around and driving a pulley 13 secured upon the shaft 14 which carries the usual cylinder 15. Splined upon the rear end of the shaft 10 are pinions 16 and 17 adapted to mesh with and drive the master-gear 18 keyed upon the transverse shaft 19.

The shaft 19 carries the sprocket-pinion 20 over which runs a sprocket-chain 21 for the purpose of transmitting power to the cross shaft 22 by engaging the sprocket 23 secured on the shaft. Upon the outer end of the shaft 22 is mounted a sprocket-wheel 24 over which travels a flexible endless traction platform or chain 25. This chain passes forward from the sprocket 24 over a loose direction pulley 26 from which it travels rearwardly in engagement with the ground, and is supported upon the bearing-rollers 27, which are journaled in a suitable frame 28.

Harvesters of this character are usually quite long, and the steering-wheel, such as 5, is located at such a distance from the traction members that if some resilient connection or mounting for such traction members were not provided, the proper operation of the separator mechanism would be seriously interfered with; therefore I have shown the frames 28 as pivoted at 29, near its rear end, to a projecting cross frame 30 of the main frame 2.

The forward ends of the frames 28 are connected by a short transverse beam 31 which has mounted upon it in line over the frames 28, suitable resilient members 32, such for instance as the coiled springs. These coiled springs abut against the lower side of a bracket 33 which is secured to the body or main frame 2; thus when the forward end of the traction member 25 encounters any abrupt obstruction in its progress the jar, instead of being transmitted to the sill and harvester body, is partially absorbed by the buffer or cushions 32.

In order to properly support the rollers 27 and the frame 28 from being twisted about the pivots 29, I have provided short rack bars 34, hinged at 35 to the beam 31, and the upper end of the rack bar maintained by an anti-friction device 36, in contact with pinions 37, secured upon the shaft 38 which is journaled upon the bracket 33. Since the frame is thus connected to the shaft 38, by means of the rack bars 34 and pinions 38, it will be obvious that the frame 28, cannot be obliquely tilted about the pivots 29, and that the frame may only have a vertical oscillation about the pivot.

In order to enable the harvester to be operated upon rolling ground, I have provided at the left hand side, a bearing-wheel 39. This bearing-wheel is adapted to be adjusted vertically with relation to the main frame 2 so that the body of the machine may be maintained in a substantially horizontal plane when the bearing traction member 25 is traveling upon a hillside, and at which time the bearing-wheel 39 would either be below or above the bottom surface of the traction member 25.

If some means were not provided whereby the normal horizontal level of the harvester could be maintained, the thresher and separator machinery would soon become inoperative by reason of the falling down to the lower side of the harvester of the incoming grain and straw. For this reason I have provided means whereby the wheel 39 may be adjusted relatively to and independently of the traction member 25. A very simple means for encompassing this adjustment is shown in Figs. 1 and 2, and which comprises a transverse shaft 40 journaled upon the main frame 2 and having an offset or crank 41 upon which the wheel 39 is mounted.

Secured adjacent to the crank 41, and disposed concentrically with the shaft 40, is a short segmental rack 42 adapted to be engaged and oscillated by the worm 43, turned upon shaft 44, and which shaft has secured to its upper end a hand-wheel 45.

The shaft 44 is journaled in any convenient position upon the main frame 2, and by manipulating the handle 45, the rack 42 will elevate or depress the crank 41, in accordance with the incline of the surface upon which the machine may be working, and consequently "level" the body of the machine. Obviously, any suitable header-frame, such for instance as shown in the dotted lines 46, may be connected as by pivots 46' to the frame 2, and which header-frame will carry the usual draper and sickle not necessary here to be illustrated.

It will be understood that the location of the traveling traction belt between the separator frame and the header frame of this machine, more equally divides the side strains, and provides a more direct and even tractive effort; it applies the greatest weight of both frames upon this traction member, and insures the best adhesion to the ground and the best traction; it allows a sufficient space for the springs, and the rack and pinion and guide mechanism of the front end of the belt frame; it gives a leverage which, in turning to the left, makes it easy to turn about the single wheel 39 as a pivot.

Having thus described my invention, what I claim and desire to secure by Letters Patent is—

1. A combined header and separator, the header frame being hinged to the outside of the separator frame, said machine including a single flexible, endless, traveling, traction member disposed longitudinally and substantially between the adjacent sides of the two frames, and an adjustable bearing wheel journaled upon the other side of the separator frame.

2. A combined header and separator the header frame being hinged to the separator frame, said machine including an endless flexible traveling support between the frames and an adjustable bearing wheel journaled upon the opposite side of the separator frame.

3. A combined header and separator, the header frame being hinged to the separator frame said machine including an endless traveling support between the frames, an adjustable bearing wheel at the opposite side of the separator frame, and steering wheels at the front of the separator frame, said wheels preventing side twisting strains upon the endless flexible support.

4. A combined header and separator, the header frame being hinged to the separator frame, said machine including an endless flexible traveling support between the frames, steering wheels in front of the separator frame, a crank shaft upon the separator frame opposite to the endless support, a segmental rack fixed to the crank end, a vertical shaft having a worm engaging the rack and a bearing wheel upon the crank-end.

5. A combined header and separator, the header frame being hinged to the separator frame said machine including an endless flexible traveling support between the frames, a frame for said support steering wheels in front, and a bearing wheel opposite to the flexible support, said support frame being hinged near one end and having yielding springs near the other end, and means to guide and prevent twisting of the frame.

6. A combined header and separator, the header frame being hinged to the separator frame said machine including an endless flexible traveling support between the frames, a frame for said support steering wheels in front, a bearing wheel on the separator frame opposite the endless support, said support frame being hinged near one end, and having an elastic cushioning device near the other end, rack bars extending upwardly at each side of the flexible support, a horizontal shaft journaled in the separator frame, pinions fixed to said shaft and engaging the rack bars whereby the endless support and frame are prevented from twisting.

In testimony whereof I have hereunto set my hand in presence of two subscribing witnesses.

BENJAMIN HOLT.

Witnesses:
Geo. H. Strong,
Dan N. Gilmore.